(12) United States Patent
Miyashita

(10) Patent No.: US 9,116,381 B2
(45) Date of Patent: Aug. 25, 2015

(54) ELECTRO-OPTICAL DEVICE AND ELECTRONIC APPARATUS

(75) Inventor: Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 102 days.

(21) Appl. No.: 13/305,976

(22) Filed: Nov. 29, 2011

(65) Prior Publication Data
US 2012/0154709 A1  Jun. 21, 2012

(30) Foreign Application Priority Data

Dec. 15, 2010 (JP) ................................ 2010-278917

(51) Int. Cl.
*G02F 1/1333* (2006.01)
*H04N 9/31* (2006.01)

(52) U.S. Cl.
CPC .... *G02F 1/133382* (2013.01); *G02F 1/133308* (2013.01); *H04N 9/3144* (2013.01); *G02F 2203/60* (2013.01)

(58) Field of Classification Search
CPC ................. G02F 1/133382; H04N 9/3144
See application file for complete search history.

(56) References Cited

U.S. PATENT DOCUMENTS 5,164,821 A * 11/1992 Tanaka et al. ............... 348/762
6,781,641 B2 * 8/2004 Okada et al. .................. 349/5
7,093,960 B2   8/2006 Kojima et al.
7,148,945 B2 * 12/2006 Yanagisawa ................. 349/161
2004/0130897 A1 *  7/2004 Kojima et al. ................ 362/294
2010/0091213 A1 *  4/2010 Miyashita ....................... 349/58

FOREIGN PATENT DOCUMENTS

| JP | 2001318361 A | * 11/2001 | ................ G02F 1/13 |
| JP | 2002-072353 A |   3/2002 | |
| JP | 2004-212956 A |   7/2004 | |
| JP | 2005-156675 A |   6/2005 | |
| JP | 2008-191360 A |   8/2008 | |
| JP | 2009-204648 A |   9/2009 | |

OTHER PUBLICATIONS

Seiko Epson Corp., Optical Modulating Device and Projector Using the Same, Machine Translation of JP 2001-318361 A from Patent Abstracts of Japan Website, pp. 1-13.*
Hirabayashi et al., Electrooptical Device and Electronic Device, Machine Translation of JP 2009-204648 from JPO AIPN website, All Pages.*

* cited by examiner

*Primary Examiner* — Dennis Y Kim
(74) *Attorney, Agent, or Firm* — ALG Intellectual Property, LLC

(57) ABSTRACT

An electro-optical device includes an electro-optical panel and a retaining member. The retaining member includes a first retaining portion that extends along a first side of the electro-optical panel and a second retaining portion that extends along a second side, the first side intersects a direction in which cooling air flows, the first retaining portion is formed to be flush with a panel face of at least one of a light incident side and a light emitting side of the electro-optical panel, and the second retaining portion is formed to protrude from at least one of the panel faces.

3 Claims, 12 Drawing Sheets

ELECTRO-OPTICAL DEVICE AND ELECTRONIC APPARATUS

BACKGROUND

1. Technical Field

The present invention relates to the technical fields of an electro-optical device such as, for example, a liquid crystal device and an electronic apparatus such as, for example, a liquid crystal projector that includes the electro-optical device.

2. Related Art

Such a type of electro-optical device has an electro-optical panel such as, for example, a liquid crystal panel housed in a box-like frame or case, and is used as a light valve such as, for example, a liquid crystal projector (for example, refer to JP-A-2004-212956, JP-A-2002-72353, and JP-A-2005-156675). For example, in a liquid crystal projector, in order to prevent a significant rise in temperature due to the powerful projected light being incident from a light source or the like, the electro-optical device is cooled by cooling air. In JP-A-2004-212956, for example, a technique of suppressing a rise in the temperature of an electro-optical device by providing a cooling air introduction unit that includes a taper unit in a case is disclosed. In JP-A-2002-72353, for example, a coupling frame that guides the cooling air is disclosed.

However, with the techniques disclosed in JP-A-2004-212956 and JP-A-2002-72353, there is a technical problem that there is a concern that the cooling efficiency of the electro-optical device may be insufficiently improved.

SUMMARY

An advantage of some aspects of the invention is that an electro-optical device with an improved cooling efficiency and an electronic apparatus that includes such an electro-optical device are provided.

An electro-optical device according to an aspect of the invention includes: an electro-optical panel; and a retaining member that retains the electro-optical panel, wherein the retaining member includes a first retaining portion that extends along a first side of the electro-optical panel and a second retaining portion that extends along a second side that intersects the first side of the electro-optical panel, wherein the first side intersects a direction in which cooling air flows, the first retaining portion is formed to be flush with a panel face of at least one of a light incident side and a light emitting side of the electro-optical panel, and the second retaining portion is formed to protrude from at least one of the panel faces.

According to an aspect of the invention, when an electro-optical device is operating, a display is performed in a pixel region of an electro-optical panel that is, for example, a liquid crystal panel or the like. Here, a "pixel region" does not mean a region of individual pixels but an entire region in which a plurality of pixels are arranged on a plane, and typically corresponds to an "image display region" or a "display region". A retaining member typically has an aperture portion that corresponds to the pixel region formed thereon, and surrounds the electro-optical panel from the fringe side thereof. The electro-optical panel is composed, for example, by an electro-optical material such as liquid crystals being interposed between a pair of substrates. When the electro-optical device is operating, light from a light source is incident on the panel face of one electro-optical panel, and the light that is incident is modulated by the electro-optical material and is emitted as display light from the other panel face.

Here, the electro-optical panel may have a dustproofing substrate on a substrate face on the side that does not face the electro-optical material that is on at least one of the pair of substrates. In a case when the electro-optical panel includes a dustproofing substrate, the substrate face on the side that does not face the electro-optical material on the dustproofing substrate becomes the panel face of the electro-optical panel. Due to the defocusing action of the dustproofing substrate, even if dust, dirt, or the like that is attached to the pixel region on a panel face of the electro-optical panel is shown in the effective screen, the dust or dirt is out of focus, and it is possible to prevent the dust or dirt from being seen clearly. Therefore, it is possible to perform a high-quality display in the electro-optical device more reliably.

According to the aspect of the invention, cooling air for cooling the electro-optical panel flows from a sirocco fan or the like, for example, to the electro-optical panel along a direction that intersects the first side of the electro-optical panel that typically has a rectangular planar shape.

According to the aspect of the invention, in particular, the retaining member includes the first retaining portion that extends along the first side of the electro-optical panel and the second retaining portion that extends along the second side that intersects the first side of the electro-optical panel, the first retaining portion is flush with a panel face of at least one of the light incident side and the light emitting side of the electro-optical panel, and the second retaining portion is formed to protrude from at least one of the panel faces. That is, the first retaining portion that extends along a direction that intersects the direction in which cooling air flows is formed to be flush with the panel face of the light incident side of or the panel face of the light emitting side of the electro-optical panel (that is, so that there is no height difference between the face of the light incident side of the first retaining portion and the panel face of the light incident side of the electro-optical panel, or so that there is no height difference between the face of the light emitting side of the first retaining portion and the panel face of the light emitting side of the electro-optical panel), and the second retaining portion that extends along the direction in which the cooling air flows is formed to protrude from the light incident side or the light emitting side, for example, from the panel face of the electro-optical panel which is formed to be flush with the first retaining portion.

Accordingly, it is possible to cause the cooling air to flow smoothly over the panel face of the electro-optical panel from the first side to a side that opposes the first side, and it is possible to effectively disperse the heat from the panel face of the electro-optical panel by the cooling air. Therefore, it is possible to improve the cooling efficiency of the electro-optical device by the cooling air. As a result, it is possible to suppress deterioration due to the heat of the electro-optical material or the like, and it is possible to perform a high-quality display.

Furthermore, according to the aspect of the invention, since the second retaining portion is formed to protrude from at least one of the panel faces, and in the manufacturing process of the electro-optical device, it is possible to prevent or reduce the number of times that something hits the panel face of the electro-optical panel and it is possible to prevent or reduce the number of times that the panel face becomes scratched.

As described above, according to the electro-optical device according to an aspect of the invention, it is possible to improve the cooling efficiency. Furthermore, in the manufacturing process, it is possible to prevent or reduce the number of times that the panel face of the electro-optical panel becomes scratched.

According to an electro-optical device according to another aspect of the invention, the second retaining portion is formed to protrude from both the panel faces of the light incident side and the light emitting side of the electro-optical panel.

According to the aspect of the invention, while it is possible to improve the cooling efficiency still further, it is also possible to prevent or reduce the number of times that both panel faces of the electro-optical panel become scratched.

An electronic apparatus according to still another aspect of the invention includes the electro-optical device (including the various aspects thereof) according to the aspect of the invention described above.

According to the electronic apparatus according to the aspect of the invention, since the electronic apparatus is equipped with the electro-optical device according to the aspect of the invention described above, it is possible to realize various electronic apparatuses that are able to perform a high-quality display such as a projection-type display device, a television, a mobile phone, an electronic diary, a word processor, a viewfinder-type or a monitor direct view-type video tape recorder, a workstation, a television phone, a POS terminal, or a touch panel. Further, as an electronic apparatus according to the aspect of the invention, it is also possible to realize an electrophoretic device or the like such as, for example, electronic paper.

The actions and other advantages of the invention will be made clear in the aspects of the invention that are described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

The aspects of the invention will be described with reference to the drawings.
First Aspect
Electronic Apparatus First, a configuration of an electronic apparatus according to the aspect of the invention will be described with reference to FIG. 1. Here, a projection-type liquid crystal projector will be used as an example of the electronic apparatus according to the aspect of the invention.

Figure 1:
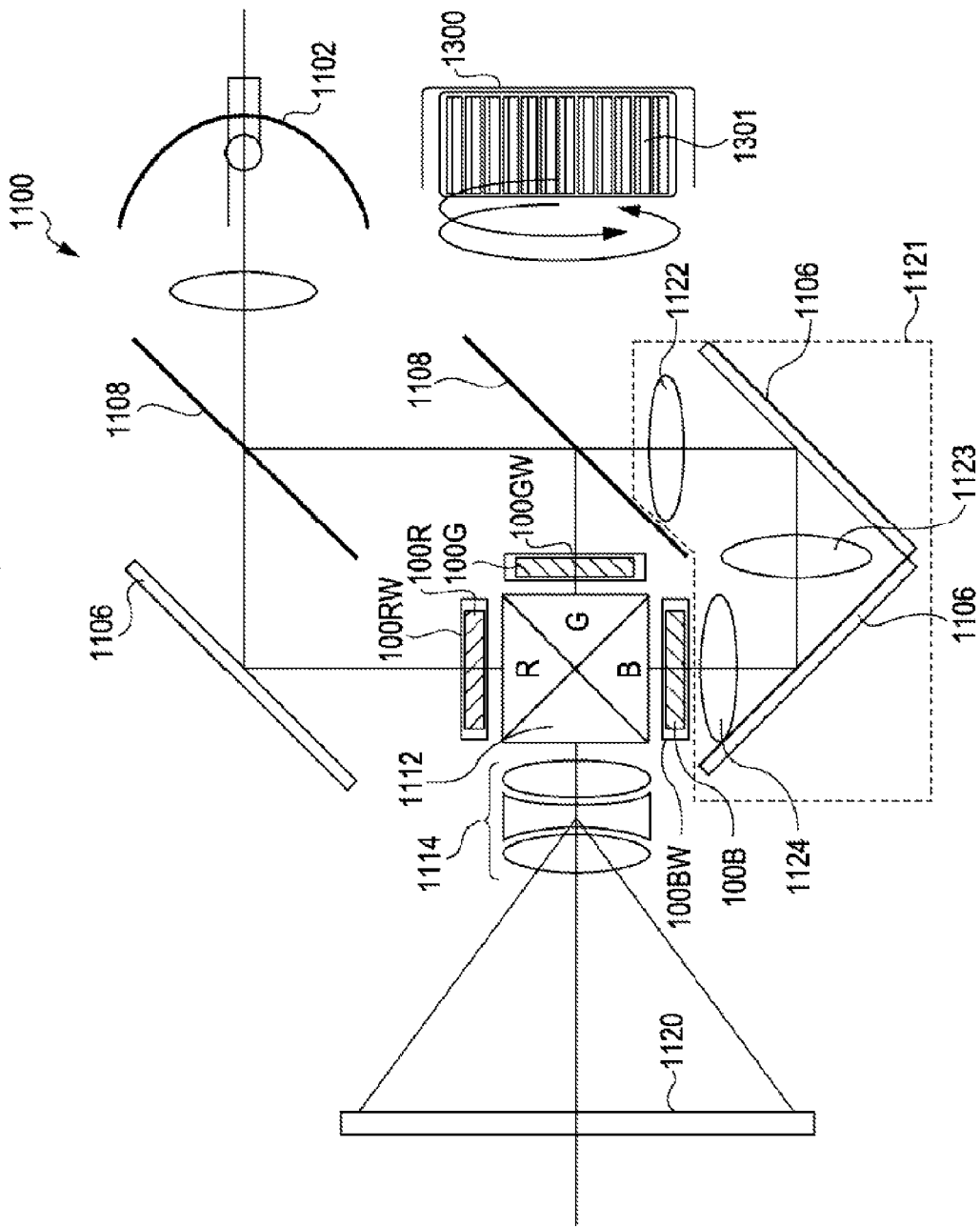
FIG. 1 is a schematic cross-sectional diagram of a projection-type liquid crystal projector according to a first aspect of the invention.

FIG. 1 is a schematic cross-sectional diagram of a projection-type liquid crystal projector according to the aspect of the invention.

The projection-type liquid crystal projector according to the aspect of the invention is constructed as a multi-panel type color projector composed of three liquid crystal devices that are an example of the electro-optical device according to the aspects of the invention as liquid crystal light valves.

In FIG. 1, a liquid crystal projector 1100 is constructed as a multi-panel type color projector using three liquid crystal light valves 100 of RGB, respectively (that is, liquid crystal light valves 100R, 100G, and 100B).

In the liquid crystal projector 1100, when projection light is emitted from a lamp unit 1102 as a white light source such as a metal halide lamp, the projection light is separated by three mirrors 1106 and two dichroic mirrors 1108 into light components R, G, and B corresponding to the three primary colors of RGB and respectively led to liquid crystal light valves 100R, 100G, and 100B that correspond to each color. Here, the B light in particular is led via a relay lens system 1121 composed of an incident lens 1122, a relay lens 1123, and an emitting lens 1124 in order to prevent light loss due to the long light path. Furthermore, the light components corresponding to the three primary colors which are respectively modulated by the liquid crystal light valves 100R, 100G, and 100B are projected as a color image via a projection lens 1114 on a screen 1120 after being synthesized by a dichroic prism 1112.

The liquid crystal light valves 100 are composed by an active matrix driving system liquid panel as described later being contained in an installation casing.

Further, a sirocco fan 1300 for sending cooling air to the liquid crystal light valves 100R, 100G, and 100B are provided on the liquid crystal projector 1100. The sirocco fan 1300 includes a substantially cylindrical shaped member that includes a plurality of blades 1301 on the side face thereof, and the blades 1301 create airflow by the substantially cylindrical member rotating with the axis thereof as the center. Here, from such a principle, the airflow that is created by the sirocco fan 1300 swirls in a spiral. Such an airflow is supplied to each of the liquid crystal light valves 100R, 100G, and 100B through an air path (not shown in FIG. 1) and is sent to each of the liquid crystal light valves 100R, 100G, and 100B from blowholes 100 RW, 100GW, and 100BW that are provided in the vicinity of each of the liquid crystal light valves 100R, 100G, and 100B.

In the configuration described above, each of the installation cases for the liquid crystal light valves 100R, 100G, and 100B are respectively attached to the three side faces of the dichroic prism 1112. Flexible printed circuits (hereinafter, referred to as "FPC" as appropriate) that are connected to the liquid crystal panel on the inside are drawn from each of the installation casings. Each end portion of the FPC that are drawn is connected to an external connector by being bend to the upper face side or the lower face side of the dichroic prism 1112.

Further, when such a liquid crystal projector 1100 is being driven, the temperature of the liquid crystal light valve 100 rises due to the projection light from the lamp unit 1102 that is a powerful light source. At this time, if the temperature rises excessively, the liquid crystals within the liquid crystal light valves 100 deteriorate and unevenness may occur in the transmissivity due to the appearance of hot spots by the localized heating of the liquid crystal device from the unevenness of the light source light.

Therefore, in the aspect of the invention, in particularly, by configuring the liquid crystal light valves 100 as below, the cooling efficiency of the liquid crystal light valves 100 by the cooling air is improved and increases in the temperature of the light crystal light valves 100 are suppressed effectively.

Electro-Optical Device

Next, the electro-optical device according to the aspect of the invention will be described with reference to FIGS. 2 to 9. Here, a liquid crystal device of an in-built driving circuit type TFT active matrix driving system is given as an example of the electro-optical device according to the aspects of the invention. The liquid crystal device according to the aspect of the invention has the liquid crystal panel contained in an installation casing and uses the liquid crystal panel as the liquid crystal light valves 100R, 100G, and 100B of the liquid crystal projector 1100 described above.

First, a configuration of the liquid crystal panel according to the aspect of the invention will be described with reference to FIGS. 2 and 3.

Figure 2:
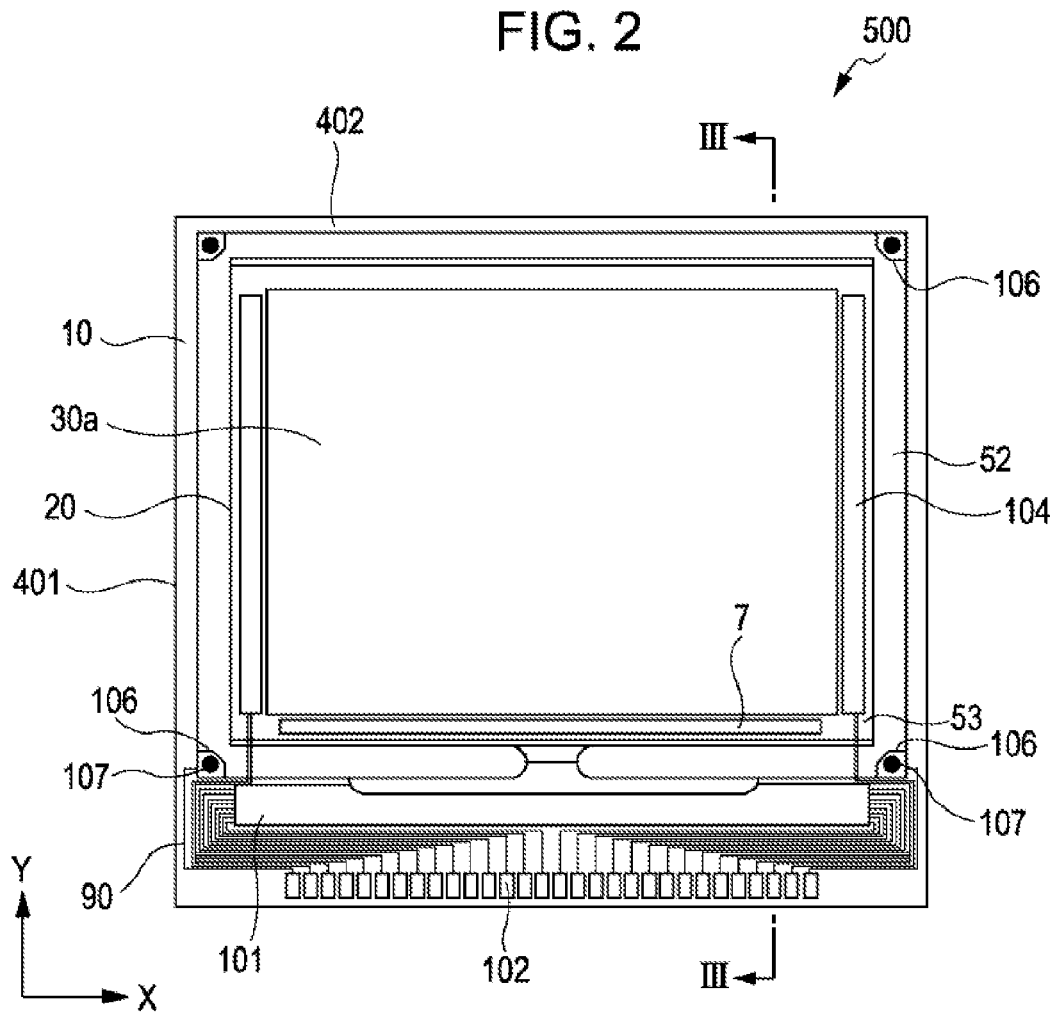
FIG. 2 is a plane diagram of a liquid crystal panel according to the first aspect of the invention.
Figure 3:
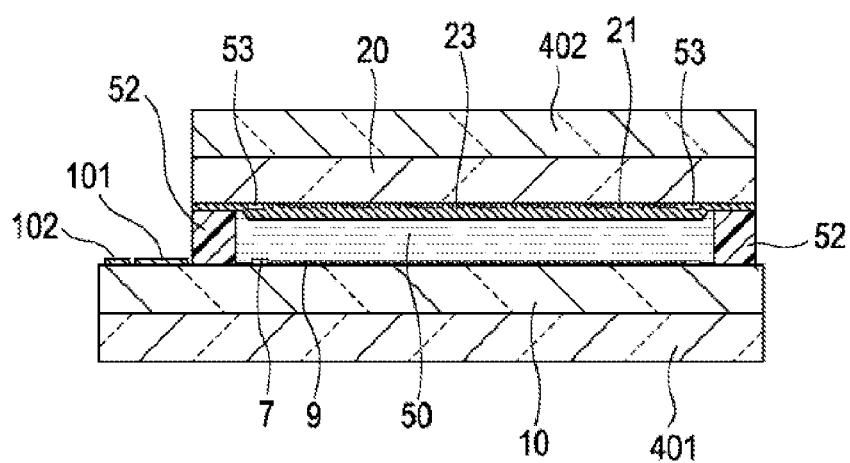
FIG. 3 is a cross-sectional diagram of FIG. 2 along the line III-III.

FIG. 2 is a plane diagram of a liquid crystal panel according to the aspect of the invention and FIG. 3 is a cross-sectional diagram of FIG. 2 along the line III-III.

In FIGS. 2 and 3, a liquid crystal panel 500 according to the aspect of the invention include a TFT array substrate 10, an opposing substrate 20, a sealing material 52, a liquid crystal layer 50, and dustproofing substrates 401 and 402.

The TFT array substrate 10 and the opposing substrate 20 are arranged opposing each other. A liquid crystal layer 50 is enclosed between the TFT array substrate 10 and the opposing substrate 20, and the TFT array substrate 10 and the opposing substrate 20 are adhered to each other by the sealing material 52 that is provided in a sealing region positioned in the vicinity of an image display region 30a where a plurality of pixels are arranged. The sealing material 52 is composed, for example, of an ultraviolet-curable resin, a thermosetting resin, or the like for adhering both substrates, and is cured by infrared radiation, heating, or the like after being applied on the TFT array substrate 10 in the manufacturing process. Further, a gap material such as glass fiber or glass beads for maintaining the gap between the TFT array substrate 10 and the opposing substrate 20 (inter-substrate gap) to a predetermined value is dispersed within the sealing material 52.

A light blocking frame light blocking film 53 that regulates the frame region of the image display region 30a that is parallel to the inside of the sealing region where the sealing material 52 is arranged and which is composed of a plurality of pixel that are arranged is provided on the opposing substrate 20 side. However, a portion or the entirety of such a frame light blocking film 53 may be provided as an in-built light blocking film on the TFT array substrate 10 side.

A data line driving circuit 101 and an external circuit connection terminal 102 are provided along a side of the TFT array substrate 10 in a region that is position to the outside of the sealing region where the sealing material 52 is arranged out of the vicinity region in the vicinity of the image display region 30a. A sampling circuit 7 is provided to be covered by the frame light blocking film 53 further to the inside of the sealing region along the side. Further, a scan line driving circuit 104 is provided along the two sides that are adjacent to the side and to be covered by the frame light blocking film 53.

Over the TFT array 10, in a region that opposes four corner portions of the opposing substrate 20 is arranged a vertical penetration terminal 106 for connecting both substrates with a vertical penetration material 107. Accordingly, the TFT array substrate 10 and the opposing substrate 20 are able to be electrically conductible.

A guidance wiring 90 for electrically connecting the external circuit connection terminal 102, the data line driving circuit 101, the scan line driving circuit 104, the vertical penetration terminal 106, and the like is formed on the TFT array substrate 10.

In FIG. 3, an alignment film (not shown) is formed over a pixel electrode 9 after wiring such as the TFT (Thin Film Transistor) for pixel switching, scan lines, and data lines have been formed on the TFT array substrate 10. On the other hand, other than an opposing electrode 21, a lattice-like stripe-shaped light blocking film 23 and an alignment film (not shown) in the uppermost layer portion are further formed on the opposing substrate 20. Further, the liquid crystal layer 50 is composed of liquid crystals in which one type or several types of nematic liquid crystals are mixed, and adopts a predetermined alignment state between the pair of alignment films.

Here, in addition to the data line driving circuit 101, the scanning line driving circuit 104, and the like, a precharging circuit for supplying a precharging signal of a predetermined voltage level ahead of an image signal to a plurality of data lines, a testing circuit for testing the quality, faults, and the like of the electro-optical device during manufacturing or shipping, or the like may be formed on the TFT array substrate 10 illustrated in FIGS. 2 and 3.

In FIGS. 2 and 3, the dustproofing substrate 401 is a transparent substrate made of glass or the like, for example. The dustproofing substrate 401 is pasted on the entire face of a face (that is, the face to the lower side in FIG. 3) on the opposite side to a face that opposes the liquid crystal layer 50 of the TFT array substrate 10 (also refer to FIGS. 6 and 7 described later). Similarly to the dustproofing substrate 401, the dustproofing substrate 402 is a transparent substrate made of glass or the like, for example. The dustproofing substrate 402 is pasted on the entire face of a face (that is, the face to the upper side in FIG. 3) on the opposite side to a face that opposes the liquid crystal layer 50 of the opposing substrate 20 (also refer to FIGS. 6 and 7 described later). Due to the dustproofing substrate 401 and 402, it is possible to prevent the image quality from lowering due to dust adhering on the TFT array substrate 10 and the opposing substrate 20 and images of the dust being projected on a projection screen when the liquid crystal device according to the aspect of the invention is used as the liquid crystal light valves 100 of the liquid crystal projector 1100.

Next, a configuration of the liquid crystal device according to the aspect of the invention in which the liquid crystal panel 500 described above is contained in an installation casing will be described with reference to FIGS. 4 to 7.

Figure 4:
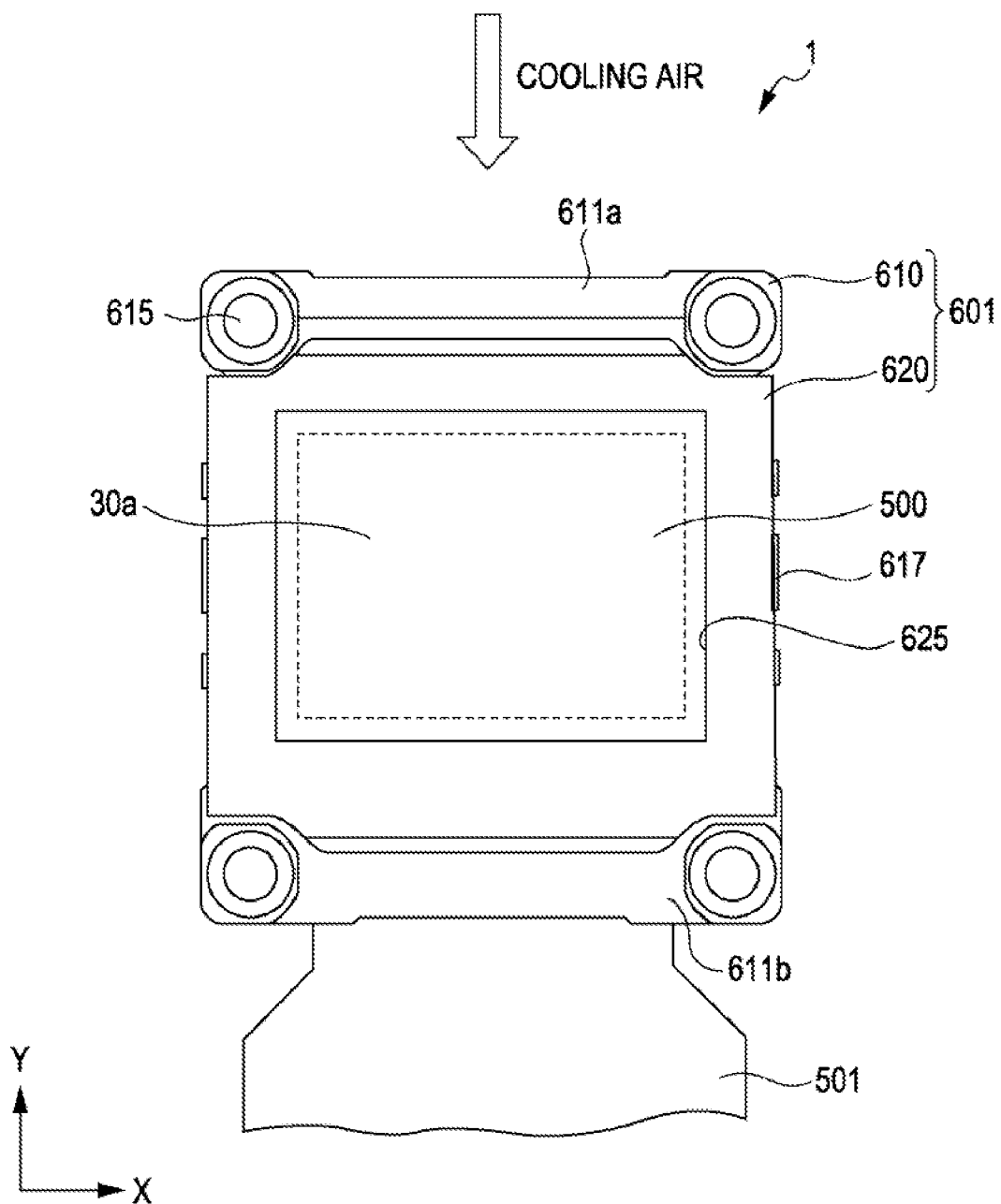
FIG. 4 is a plane diagram of a liquid crystal device according to the first aspect of the invention seen from the opposing substrate side with respect to the liquid crystal layer.
Figure 5:
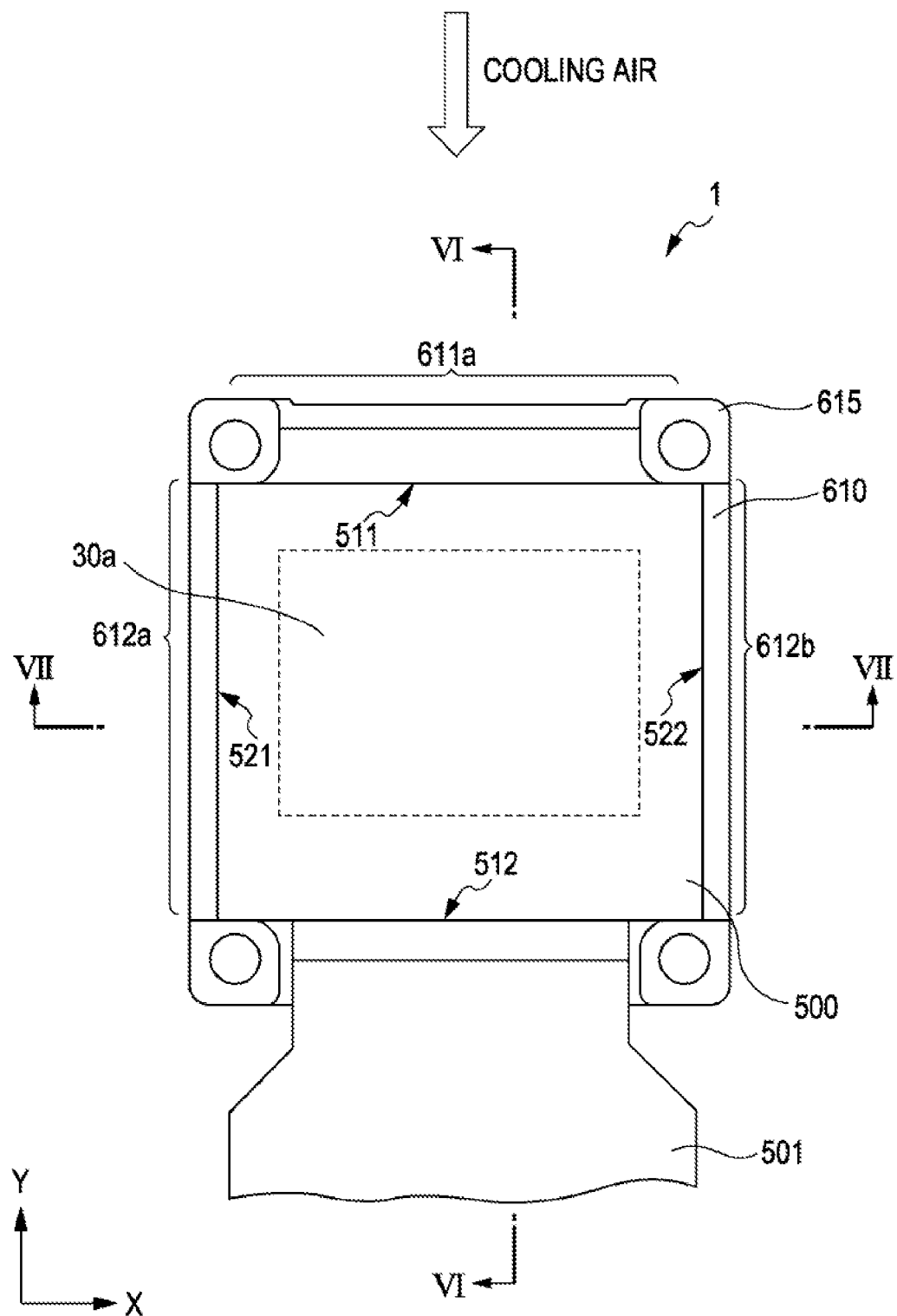
FIG. 5 is a plane diagram of a liquid crystal device according to the aspect of the invention seen from a TFT array substrate side with respect to the liquid crystal layer.

FIG. 4 is a plane diagram of a liquid crystal device 1 according to the aspect of the invention seen from the opposing substrate 20 side with respect to the liquid crystal layer 50. FIG. 5 is a plane diagram of the liquid crystal device 1 according to the aspect of the invention seen from the TFT array substrate 10 side with respect to the liquid crystal layer 50.

Figure 6:
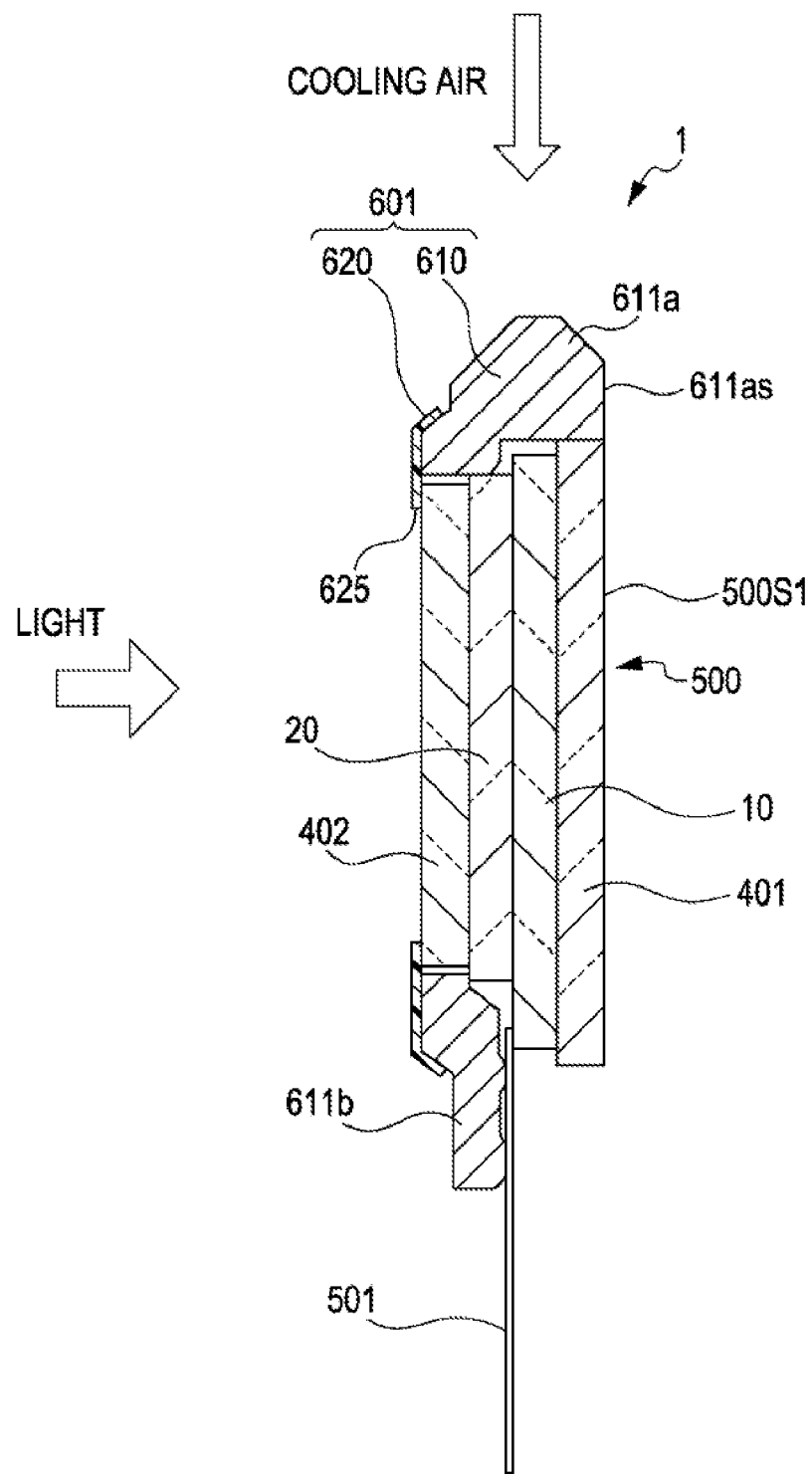
FIG. 6 is a cross-sectional diagram of FIG. 5 along the line VI-VI.
Figure 7:
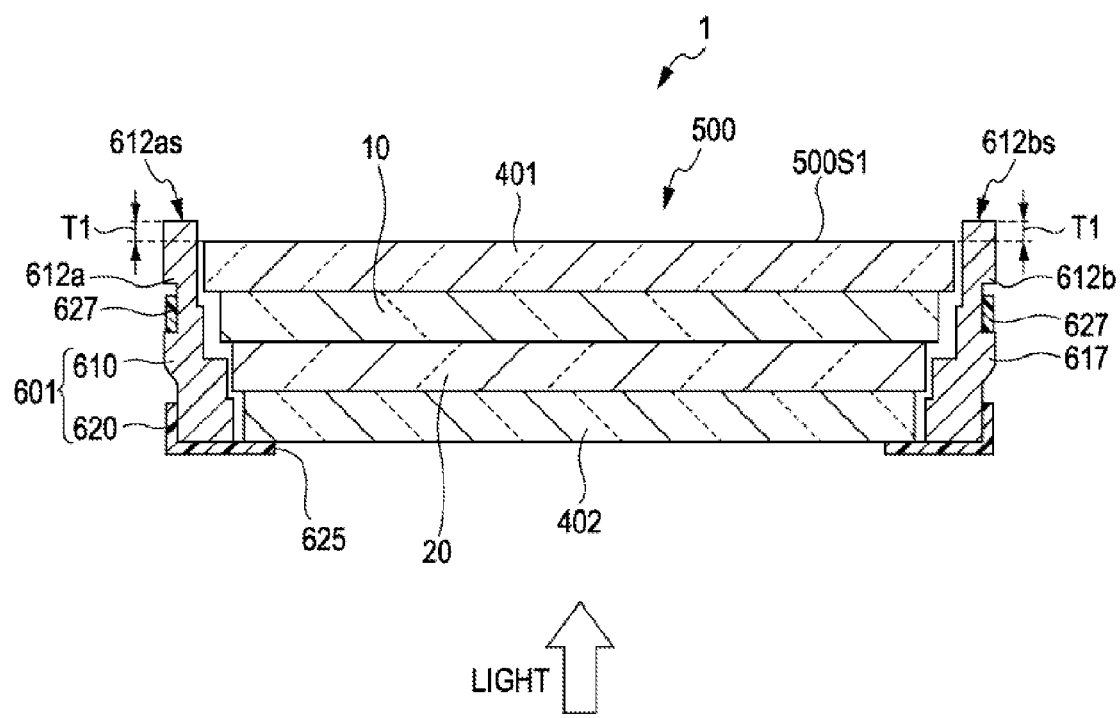
FIG. 7 is a cross-sectional diagram of FIG. 5 along the line VII-VII.

FIG. 6 is a cross-sectional diagram of FIG. 5 along the line VI-VI. FIG. 7 is a cross-sectional diagram of FIG. 5 along the line VII-VII.

In FIGS. 4 to 7, the liquid crystal device 1 according to the aspect of the invention includes the liquid crystal panel 500 and an installation casing 601.

The liquid crystal panel 500 has the form described above with reference to FIGS. 2 and 3, and an FPC 501 is connected to the external circuit connection terminal 102 (refer to FIG. 2).

As illustrated in FIGS. 4, 6, and 7, the installation casing 601 is composed of a frame 610 as an example of a "retaining member" according to the aspects of the invention which contains and retains the liquid crystal panel 500 and a cover member 620 that is covered by the frame 610. The frame 610 and the cover member 620 are respectively formed of metals such as, for example, aluminum, or the like. Here, the frame 610 and the cover member 620 may be respectively formed, for example, of resin or the like.

In FIGS. 4 and 5, installation holes 615 are provided in the four corners of the frame 610. The installation holes 615 are used when the liquid crystal device 1 is installed in the liquid crystal projector 1100 illustrated in FIG. 1. That is, the liquid crystal device 1 is installed within the liquid crystal projector 1100 by being screwed onto the projector 1100 using screws that penetrate the installation holes 615.

In FIGS. 4 to 7, the liquid crystal device 1 is under the assumption that light is incident from the dustproofing substrate 402 side (that, the opposing substrate 20 side), transmits the liquid crystal panel 500, and is emitted from the dustproofing substrate 401 side (TFF array substrate 10 side) (in FIG. 1, the dustproofing substrate 402 and not the dustproofing substrate 401 opposes the dichroic prism 1112). The liquid crystal panel 500 is contained in the frame 610 by being adhered and fixed to the frame 610 by an adhesive in a state of being surrounded from the frame side thereof by the frame 610.

The cover member 620 includes a frame-like main body on which a window portion 625 (refer to FIG. 4) is provided as an aperture portion and a hook 627 (refer to FIG. 7) on both sides of the main body. The window portion 625 opens to oppose the image display region 30a so as to cause light to transmit the image display region 30a of the contained liquid crystal panel 500. Therefore, the light that is emitted from the lamp unit 1102 within the liquid crystal projector 1100 illustrated in FIG. 1 passes through the window portion 625 and is able to be incident on the liquid crystal panel 500.

The frame 610 is formed in a frame shape to be able to surround the liquid crystal panel 500 from the rim side thereof, and includes frame portions 611a, 611b, 612a, and 612b that extend along each of the four sides of the rectangular planar liquid crystal panel 500. Here, the frame portion 611a is an example of the "first retaining portion" according to the aspects of the invention, and the frame portions 612a and 612b are examples of the "second retaining portion" according to the aspects of the invention.

As illustrated in FIG. 5, the frame portion 611a is formed to extend along a side 511 that intersects the direction in which the cooling air of the liquid crystal panel 500 flows.

The frame portion 611b is formed to extend along a side 512 that opposes the side 511 of the liquid crystal panel 500. That is, similarly to the frame portion 611a, the frame portion 611b is formed to extend in a direction that intersects the direction in which the cooling air flows on the opposite side of the frame portion 611a with respect to the liquid crystal panel 500. Here, the side 511 is position more to the upstream side of the flow of the cooling air than is the side 512.

The frame portion 612a is formed to extend along a side 521 that intersects the side 511 of the liquid crystal panel 500. In other words, the frame portion 612a is formed to extend along the direction in which the cooling air flows.

The frame portion 612b is formed to extend along a side 522 that opposes the side 521 of the liquid crystal panel 500. In other words, similarly to the frame portion 612a, the frame portion 612b is formed to extend along the direction in which the cooling air flows to the opposite side to the frame portion 612a with respect to the liquid crystal panel 500. Here, the side 522 is a side that opposes the side 521 of the liquid crystal panel 500, and is the side that is different to the side 521 out of the two sides that intersect the side 511.

As illustrated in FIGS. 6 and 7, in the aspect of the invention in particular, the frame portion 611a is formed to be flush with a panel face 500S1 of the light emitting side of the liquid crystal panel 500, and the frame portions 612a and 612b are formed to protrude from the panel face 500S1.

That is, as illustrated in FIG. 6, in the aspect of the invention in particular, the frame portion 611a that extends along the direction that intersects the direction in which the cooling air flows is formed to be flush with the panel face S1 of the liquid crystal panel 500, that is, so that there is no height difference between a face 611 as of the light emitting side of the frame 611a and the panel face S1. Further, as illustrated in FIG. 7, the frame portions 612a and 612b that respectively extend along the direction in which the cooling air flows are formed to protrude more to the light emitting side that the panel face S1 of the liquid crystal panel 500, that is, so that a height difference T1 is caused between each of a face 612 as if the light emitting side of the frame portion 612a and the panel face S1 of the liquid crystal panel 500 and a face 612bs of the light emitting side of the frame portion 612b and the panel face S1 of the liquid crystal panel 500.

Figure 8:
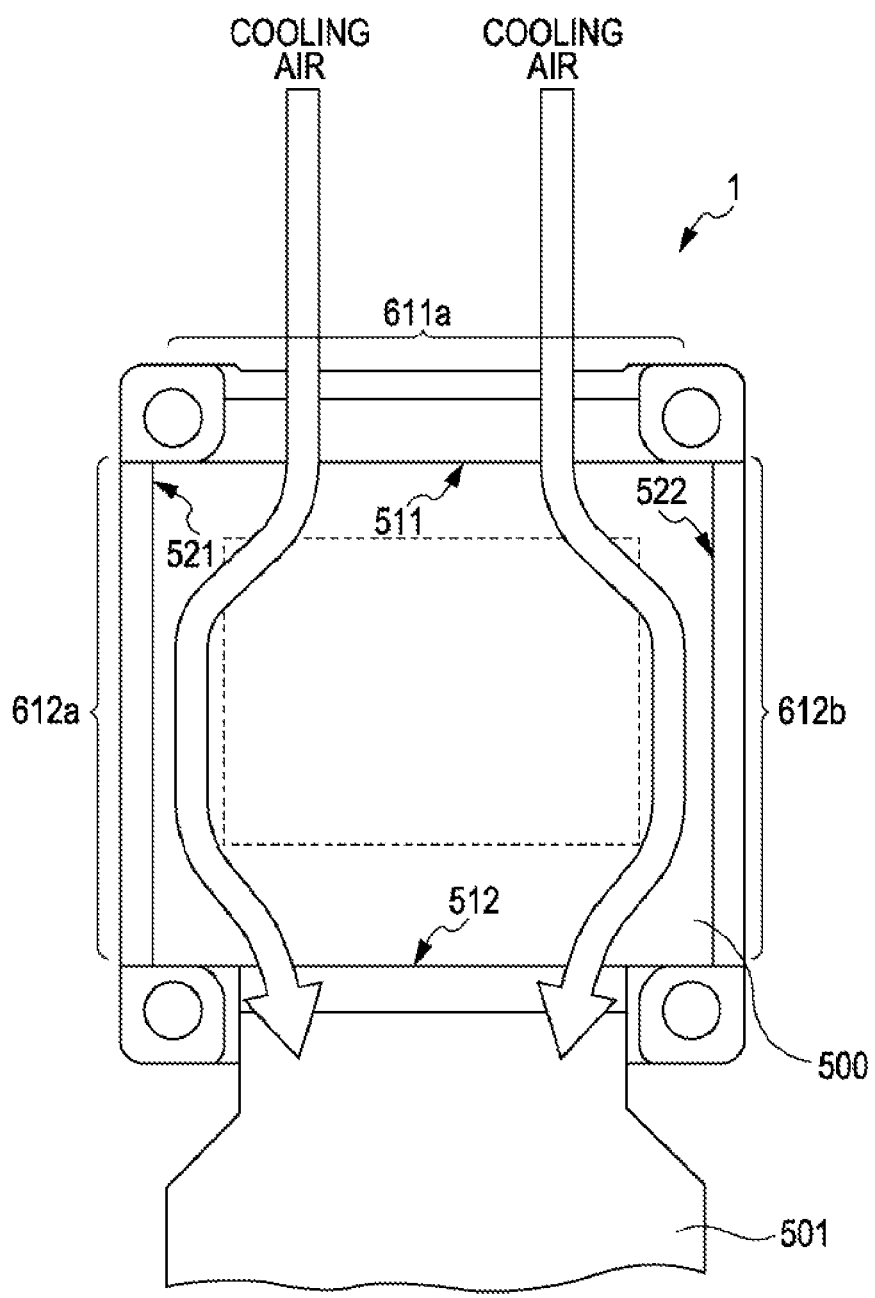
FIG. 8 is a (first) diagram that illustrates an example of the flow of cooling air according to the first aspect of the invention as a concept.
Figure 9:
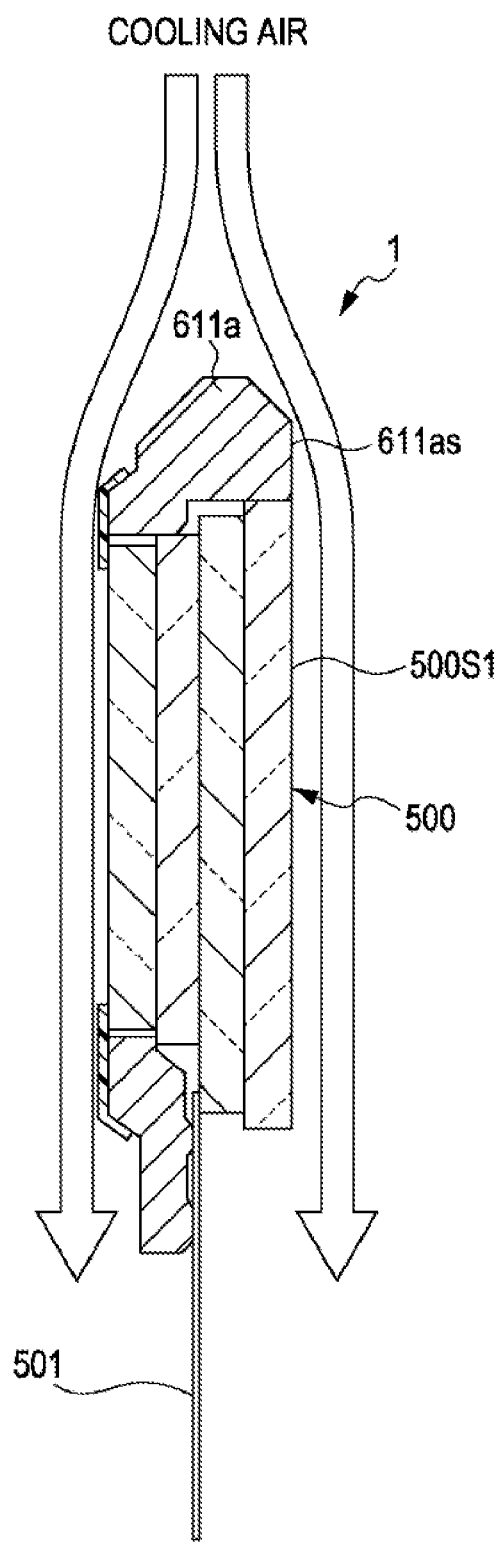
FIG. 9 is a (second) diagram that illustrates an example of the flow of cooling air according to the first aspect of the invention as a concept.

Accordingly, as illustrated in FIGS. 8 and 9, it is possible to cause the cooling air to flow smoothly over the panel face S1 of the liquid crystal panel 500 from the side 511 side to the side 512 side along the frame portions 612a and 612b, and it is possible to disperse heat effectively by the cooling air from the panel face S1 of the liquid crystal panel 500. Here, FIGS. 8 and 9 are diagrams that illustrate the flow of the cooling air in the aspect of the invention as a concept, and FIG. 8 is illustrated corresponding to FIG. 5 and FIG. 9 is illustrated corresponding to FIG. 6.

Therefore, it becomes possible to increase the cooling efficiency of the liquid crystal device 1 by the cooling air. As a result, it is possible to suppress deterioration due to heating of the liquid crystal layer 50 or the like, and it is possible to perform a high quality display.

Furthermore, according to the aspect of the invention, as described above, since the frame portions 612a and 612b are formed to protrude from the panel face S1 of the liquid crystal panel 500, in the manufacturing process of the liquid crystal device 1, it is possible to prevent or reduce the number of times that something hits the panel face S1 of the liquid crystal panel 500 and it is possible to prevent or reduce the number of times that the panel face S1 becomes scratched.

As described above, according to the liquid crystal device 1 according to the aspects of the invention, it is possible to improve the cooling efficiency of the liquid crystal panel 500 by the cooling air. Furthermore, in the manufacturing process, it is possible to prevent or reduce the number of times that the panel face S1 of the liquid crystal panel 500 becomes scratched.

Second Aspect

A liquid crystal device according to a second aspect of the invention will be described with reference to FIG. 10.

Figure 10:
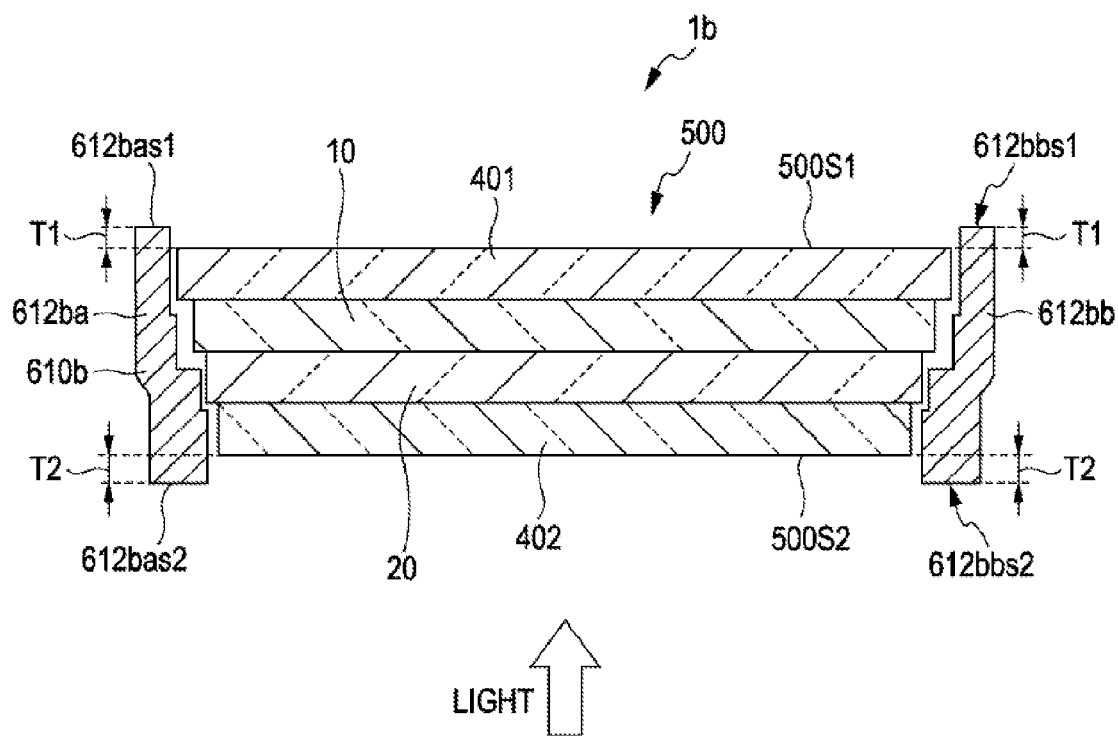
FIG. 10 is a cross-sectional diagram of a liquid crystal device according to a second aspect of the invention.

FIG. 10 is a cross-sectional diagram of the liquid crystal device according to the second aspect of the invention, and is a cross-sectional diagram of the same intent as FIG. 7. Here, in FIG. 10, the same reference symbols are given to the same constituent elements as the constituent elements according to the first aspect of the invention illustrated in FIGS. 1 to 9, and description thereof will be omitted.

In FIG. 10, a liquid crystal device 1b according to the second aspect of the invention differs from the liquid crystal device 1 according to the first aspect of the invention described above in that a frame 610b is included instead of the frame 610 according to the first aspect of the invention described above, and in other respects, is configured largely similarly to the liquid crystal device 1 according to the first aspect of the invention described above.

The frame 610b differs from the frame 610 according to the first aspect of the invention described above in that frame portions 612ba and 612bb are respectively included instead of the frame portions 612a and 612b according to the first aspect of the invention described above, and in other respects, is configured largely similarly to the frame 610 according to the first aspect of the invention described above. Here, the frame portions 612ba and 612bb are examples of the "second retaining portion" according to the aspect of the invention.

The frame portion 612ba is formed to extend along the side 521 (refer to FIG. 5) that intersects the side 511 of the liquid crystal panel 500. In other words, the frame portion 612ba is formed to extend along the direction in which the cooling air flows.

The frame portion 612bb is formed to extend along the side 522 that opposes the side 521 of the liquid crystal panel 500. In other words, similarly to the frame portion 612ba, the frame portion 612bb is formed to extend along the direction in which the cooling air flows to the opposite side to the frame portion 612ba with respect to the liquid crystal panel 500.

In the aspect of the invention in particular, the frame portions 612ba and 612bb are formed to protrude from the panel face 500S1 of the light emitting side of the liquid crystal panel 500 and are also formed to protrude from a panel face 500S2 of the light emitting side of the liquid crystal panel 500. That is, the frame portions 612ba and 612bb that respectively extend along the direction in which the cooling air flows are formed so that the height difference T1 occurs both between a face 612bas1 of the light emitting side of the frame portion 612ba and the panel face S1 of the liquid crystal panel 500 and between a face 612bbs1 of the light emitting side of the frame portion 612bb and the panel face S1 of the liquid crystal panel 500 and also so that a height difference T2 occurs both between a face 612bas2 of the light emitting side of the frame portion 612ba and the panel face S2 of the liquid crystal panel 500 and between a face 612bbs2 of the light emitting side of the frame portion 612bb and the panel face S2 of the liquid crystal panel 500.

Accordingly, it is possible to cause the cooling air to flow smoothly along the frame portions 612ba and 612bb from the side 511 side to the side 512 side over both panel faces S1 and S2 of the liquid crystal panel 500, and it is possible to disperse head effectively from the panel faces S1 and S2 of the liquid crystal panel 500 by the cooling air. Therefore, it is possible to improve the cooling efficiency of the liquid crystal device 1b by the cooling air even further.

Furthermore, according to the aspect of the invention, as described above, since the frame portions 612ba and 612bb are formed to protrude from each of the panel faces S1 and S2 of the liquid crystal panel 500, in the manufacturing process of the liquid crystal device 1b, it is possible to prevent or reduce the number of times that something hits the panel faces S1 and S2 of the liquid crystal panel 500 and it is possible to prevent or reduce the number of times that the panel face S1 becomes scratched.

Third Aspect

A liquid crystal device according to a third aspect of the invention will be described with reference to FIGS. 11 to 13.

Figure 11:
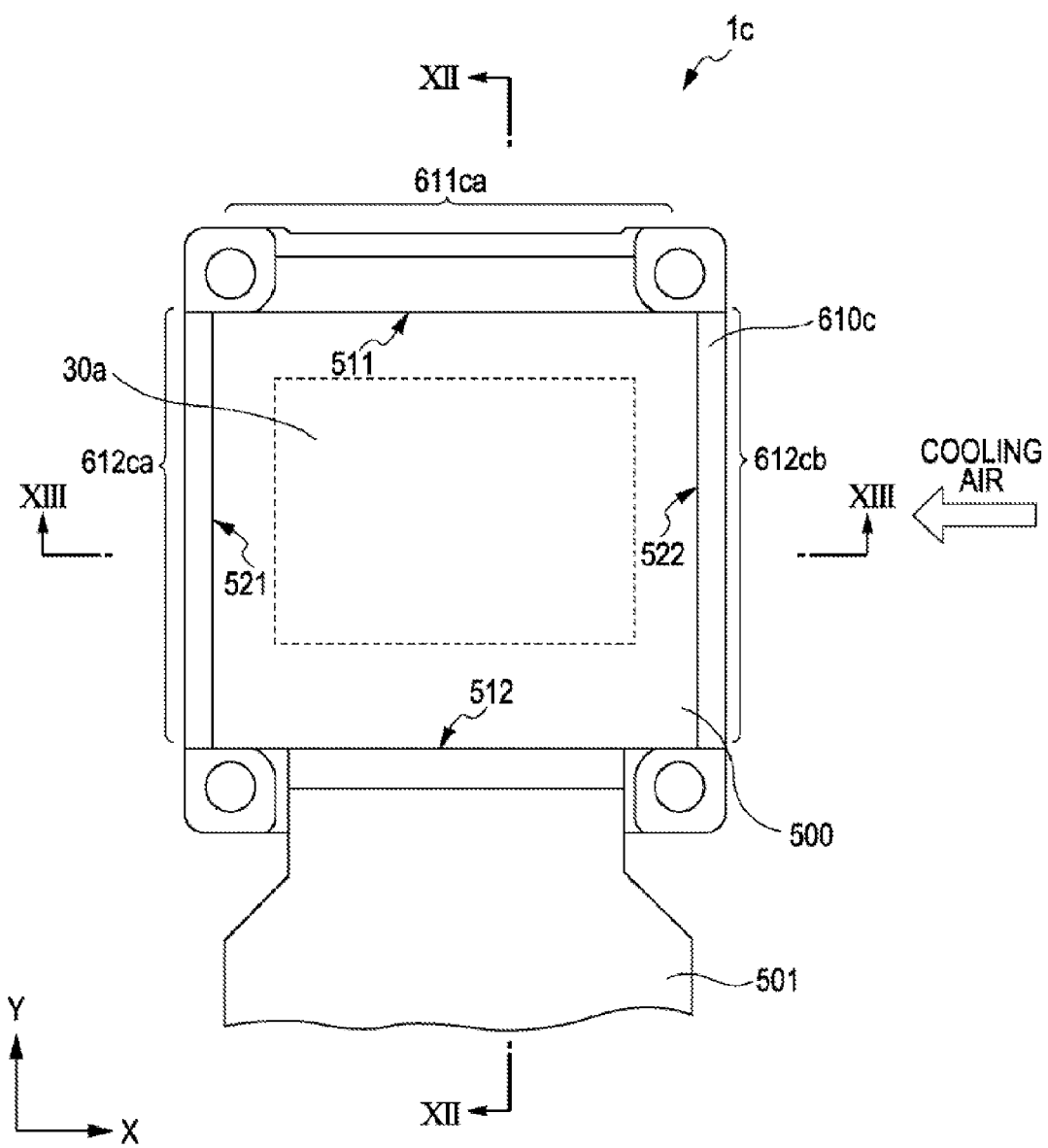
FIG. 11 is a plane diagram of a liquid crystal device according to a third aspect of the invention seen from the TFT array substrate side with respect to the liquid crystal layer.

FIG. 11 is a plane diagram of a liquid crystal device according to the third aspect of the invention seen from the TFT array substrate side with respect to the liquid crystal layer. FIG. 12 is a cross-sectional diagram of FIG. 11 along the line XII-XII. FIG. 13 is a cross-sectional diagram of FIG. 11 along the line XIII-XIII. Here, in FIGS. 11 to 13, the same reference symbols are given to the same constituent elements as the constituent elements according to the first aspect of the invention illustrated in FIGS. 1 to 9, and description thereof will be omitted.

As illustrated in FIG. 11, in the third aspect of the invention, the direction in which the cooling air flows to the liquid crystal device is different from the first aspect of the invention described above. That is, while the cooling air flows along a direction that intersects the side 511 of the liquid crystal panel 500 in the first aspect of the invention described above, the cooling air flows in a direction that intersects the side 522 of the liquid crystal panel 500 (in other words, the cooling air flows along a direction along the side 511 of the liquid crystal panel 500) in the third aspect of the invention.

Figure 12:
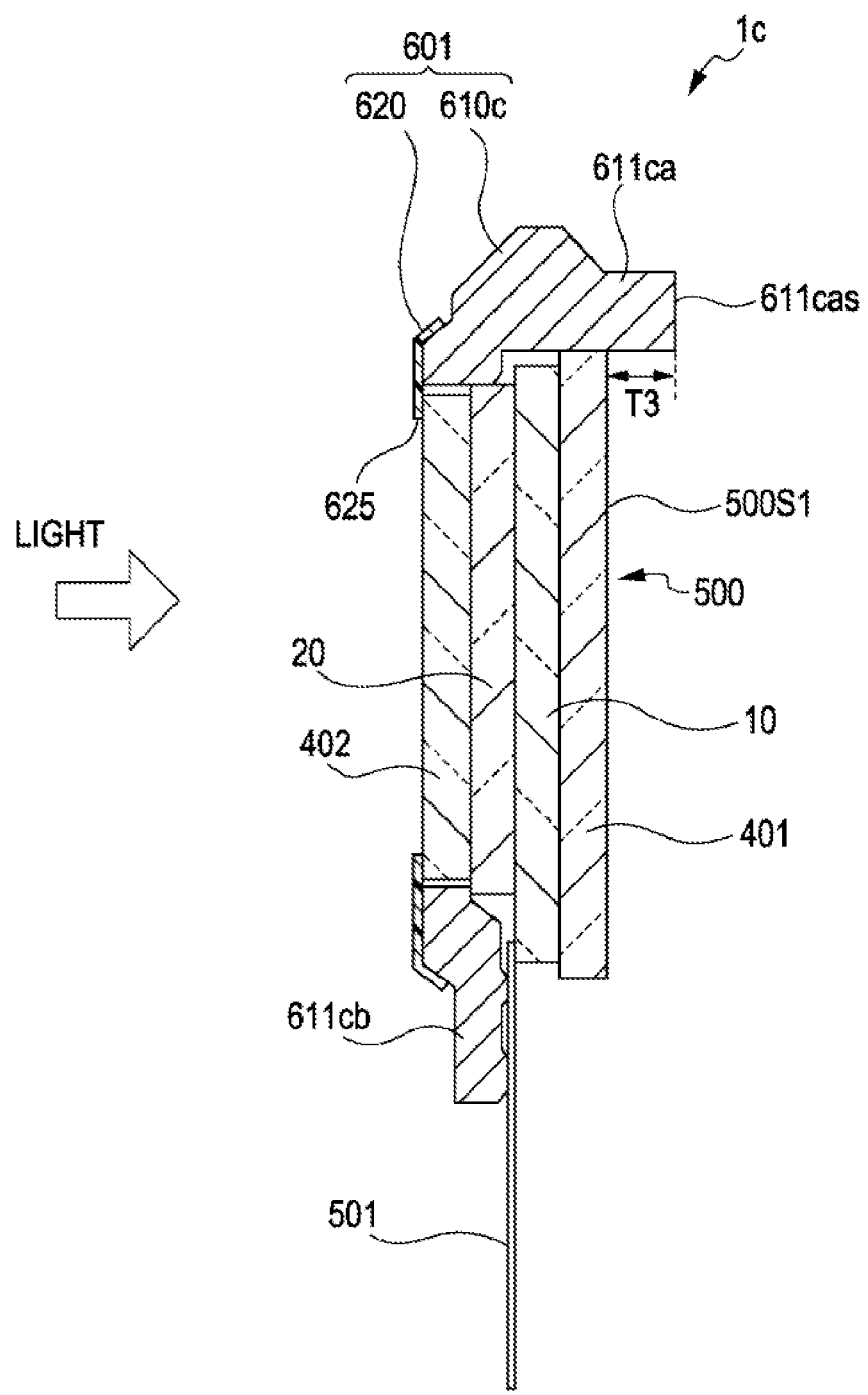
FIG. 12 is a cross-sectional diagram of FIG. 11 along the line XII-XII.
Figure 13:
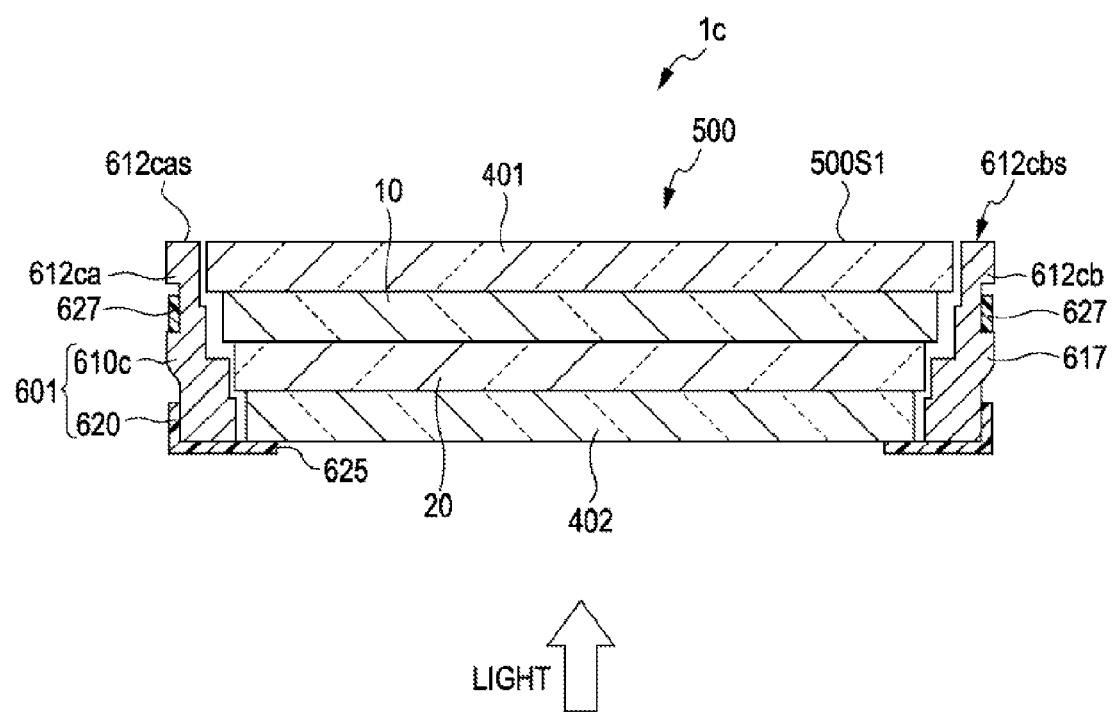
FIG. 13 is a cross-sectional diagram of FIG. 11 along the line XIII-XIII.

In FIGS. 11 to 13, a liquid crystal device 1c according to the third aspect of the invention differs from the liquid crystal device 1 according to the first aspect of the invention described above in that a frame portions 610c is included instead of the frame 610 according to the first aspect of the invention described above, and in other respects, is configured largely similarly to the liquid crystal device 1 according to the first aspect of the invention described above.

The frame 610c is formed in a frame shape to be able to surround the liquid crystal panel 500 from the rim side thereof, and includes frame portions 611ca, 611cb, 612ca, and 612cb that extend along each of the four sides of the rectangular planar liquid crystal panel 500. Here, the frame portion 611ca is an example of the "second retaining portion" according to the aspects of the invention, and the frame portions 612ca and 612cb are examples of the "second retaining portion" according to the aspects of the invention.

As illustrated in FIG. 11, the frame portion 612cb is formed to extend along the side 522 that intersects the direction in which the cooling air of the liquid crystal panel 500 flows.

The frame portion 612ca is formed to extend along the side 521 that opposes the side 522 of the liquid crystal panel 500. That is, similarly to the frame portion 612cb, the frame portion 612ca is formed to extend in a direction that intersects the direction in which the cooling air flows to the opposite side to the frame portion 612cb with respect to the liquid crystal panel 500. Here, the side 522 is positioned further to the upstream side of the cooling air than is the side 521.

The frame portion 611ca is formed to extend along the side 511 that intersects the side 522 of the liquid crystal panel 500. In other words, the frame portion 611ca is formed to extend in the direction in which the cooling air flows.

The frame portion 611cb (refer to FIG. 12) is formed to extend along the side 512 that opposes the side 511 of the liquid crystal panel 500. In other words, similarly to the frame portion 611ca, the frame portion 611cb is formed to extend along the direction in which the cooling air flows to the opposite side to the frame portion 611ca with respect to the liquid crystal panel 500.

As illustrated in FIGS. 12 and 13, in particular in the aspect of the invention, the frame portions 612cb and 612ca are formed to be flush with the panel face 500S1 of the light emitting side of the liquid crystal panel 500 and the frame portion 611ca is formed to protrude from the panel face 500S1.

That is, as illustrated in FIG. 13, in the aspect of the invention in particular, the frame portions 612cb and 612ca that extend along a direction that intersects the direction in which the cooling air flows are formed to be flush with the panel face S1 of the liquid crystal panel 500, that is, so that there is no height difference between both the face 612cbs of the light emitting side of the frame portion 612cb and the panel face S1 and between the face 612cas of the light emitting side of the frame portion 612ca and the panel face S1. Furthermore, as illustrated in FIG. 12, the frame portion 611ca that extends along the direction in which the cooling air flows if formed to protrude more to the light emitting side than the panel face S1 of the liquid crystal panel 500, that is, so that a height difference T3 occurs between the face 611cas of the light emitting side of the frame portion 611ca and the panel face S1 of the liquid crystal panel 500.

Accordingly, it is possible to cause the cooling air to flow smoothly along the frame portion 611ca from the side 522 side to the side 521 side over the panel face S1 of the liquid crystal panel 500, and it is possible to disperse the heat from the panel face S1 of the liquid crystal panel 500 by the cooling air effectively. Therefore, it is possible to increase the cooling efficiency of the liquid crystal device 1c by the cooling air. As a result, it is possible to suppress deterioration by heating of the liquid crystal layer 50 or the like, and it is possible to perform a high quality display.

Furthermore, according to the aspect of the invention, as described above, since the frame portion 611ca protrudes from the panel face S1 of the liquid crystal panel 500, in the manufacturing process of the liquid crystal device 1c, it is possible to prevent or reduce the number of times that something hits the panel face S1 of the liquid crystal panel 500 and it is possible to prevent or reduce the number of times that the panel face S1 becomes scratched.

Here, as an electronic apparatus to which the aspects of the invention are able to be applied, other than the projection-type liquid crystal projector described with reference to FIG. 1, a device including a mobile personal computer, a mobile phone, a liquid crystal television, a viewfinder-type or monitor direct view-type video tape recorder, a car navigation device, a pager, an electronic diary, a calculator, a word processor, a workstation, a television phone, a POS terminal, a touch panel, or the like is exemplified. Furthermore, needless to say, the aspects of the invention are able to be applied to such various electronic apparatuses.

Further, other than a liquid crystal device according to the aspects described above, the aspects of the invention are able to be applied to a reflection type liquid crystal device to which an element is formed on a silicon substrate (LCOS), a plasma display (PDP), a field emission type display (FED, SED), an organic EL display, a digital micro mirror device (DMD), an electrophoretic device, or the like.

The invention is not limited to the aspects of the invention described above, appropriate modifications within the range of the claims and within a range that does not contradict the gist or the ideas of the invention that are read from the entirety of the specification are possible, and an electro-optical device and an electronic apparatus that includes the electro-optical device with such modifications are also included within the technical range of the invention.

This application claims priority from Japanese Patent Application No. 2010-278917 filed in the Japanese Patent Office on Dec. 15, 2010, the entire disclosure of which is hereby incorporated by reference in its entirely.

What is claimed is:

1. An electro-optical device comprising:
an electro-optical panel;
a retaining member that retains the electro-optical panel; and
a cover member,
wherein the retaining member includes:
a first retaining portion that extends along a first side of the electro-optical panel that intersects a direction in which cooling air flows at a cooling air flowing side of the electro-optical panel, the first retaining portion including a convex portion extending along with the direction, the convex portion including:
a first incline portion at a light incident side of the electro-optical panel;
a second incline portion at a light emitting side of the electro-optical panel; and
a top portion, between the first incline portion and the second incline portion, the top portion being closer to the light emitting side than the light incident side, and
a second retaining portion that extends along a second side of the electro-optical panel that intersects the first side of the electro-optical panel, and
wherein
the first side intersects a direction in which cooling air flows,
the first retaining portion is disposed so as to be flush with at least one of panel faces of a light incident side and a light emitting side of the electro-optical panel,
the cover member covers the first retaining portion and the at least one of the panel faces of the light incident side and the light emitting side of the electro-optical panel, and
the second retaining portion is disposed so as to protrude from the panel face of the light incident side without overlapping the panel face of the light incident side in plan view.

2. The device according to claim 1,
wherein the second retaining portion is disposed so as to protrude from both panel faces of the light incident side and the light emitting side of the electro-optical panel.

3. An electronic apparatus comprising the electro-optical device according to claim 1.

* * * * *